Patented Dec. 20, 1938

2,140,872

UNITED STATES PATENT OFFICE 2,140,872

PROCESS OF REFINING CAMPHOR

Lee Cone Holt, Wilmington, Del., and Gastaō Etzel, Pitman, N. J., assignors to E. I. du Pont de Nemours & Company, Wilmington, Del., a corporation of Delaware No Drawing. Application September 2, 1936, Serial No. 99,162

8 Claims. (Cl. 260—589)

This invention relates to a process for treating natural and synthetic camphor, and more particularly to a process for treating commercial grades of camphor to render them suitable for use in the manufacture of photographic film.

It is known that technical grades of camphor commonly contain impurities which cause fogging and desensitization of sensitized coatings on photographic film base and, therefore, it is desirable to provide a process for treating camphor which will furnish a product free of such impurities.

An object of this invention is to provide such a process for use in the preparation of synthetic camphor which will give a product free of the impurities that cause fogging and desensitization of sensitized photographic emulsions. A further object is to provide a process for treating both natural and synthetic camphors to free them from impurities which cause fogging and desensitization of sensitized photographic emulsions. A still further object is to provide a method for preventing re-formation of photographic fog-producing impurities in camphor intended for use in the manufacture of photographic film.

These objects are accomplished according to the invention by keeping synthetic camphor during the final distillation or sublimation and cooling stage of the process in a non-oxidizing atmosphere, which prevents the formation of fog-causing impurities, and by heating fog-causing camphor to a sufficient degree and for a sufficient length of time in a non-oxidizing atmosphere to break down and destroy the fog-causing impurities, and in thereafter cooling the camphor to normal or atmospheric temperature while still carefully protecting it from contact with any oxidizing agents. Synthetic camphor which is prepared in a molten state in contact with a non-oxidizing atmosphere is free from fog-causing impurities and camphor which contains such impurities can be freed from them by bringing the camphor to a molten state and retaining it in that condition for about an hour or longer, provided the heating takes place in an oxygen-free atmosphere. Heating impure camphor at high temperatures for correspondingly shorter periods of time out of contact with oxidizing agents also gives a product satisfactory for photographic use. For example, at distillation temperatures fog-causing camphor is made fit for photographic use in the short period required for passage through the distillation and condensing systems, provided all contact with oxidizing agents is avoided during distillation and cooling to room temperature.

In treatments at higher temperatures under non-oxidizing conditions, the camphor may be heated at super atmospheric pressures to shorten the time of treatment, and it may be dry distilled or steam distilled with satisfactory results. In the latter case the warm, moist, distilled camphor must be cooled and dried in a stream of inert gas to prevent re-formation of fog-causing impurities.

This process of heat-treating camphor out of contact with oxidizing agents can be applied advantageously during various manipulations of camphor such as casting, graining, extruding, flaking and subliming.

The following examples serve to illustrate the process of the invention without limiting it thereto:

Example I

About 3,000 parts of technical grade synthetic camphor were distilled under a partial vacuum of 15 inches. The distillation was discontinued when about 100 parts of residue were left in the distilling flask. The camphor distilled at a temperature of 183 to 190° C. The distilled camphor was collected in a water cooled receiver. At the end of the distillation the vacuum in the system was replaced by nitrogen gas. A positive pressure of nitrogen gas was kept in the receiver until it was cooled to 25° C. About 2,900 parts of camphor were obtained which were shown by tests to be free from photographic fog producing impurities.

Example II

About 3,000 parts of synthetic camphor were vacuum distilled as in Example I except that carbon dioxide was used instead of nitrogen gas to displace atmospheric oxygen. The liquid camphor was flaked by feeding it onto a cooled rotating drum. The camphor solidifies in a thin layer and was automatically removed by means of a knife. The entire flaker was enclosed in an atmosphere of carbon dioxide. The finished flaked product amounted to 2,800 parts and was found by tests to contain no fogging impurities.

Example III

An amount of purified camphor weighing about 3,000 grams was tested and found to be free of fog-producing impurities. A portion was melted in an enclosed vessel and was converted into solid sticks by extrusion through a ⅞″ water-cooled die. The camphor was kept in an atmosphere of $CO_2$ during melting, and the extruded sticks also were kept out of contact with air by surrounding them with $CO_2$ until they had cooled to atmospheric temperature. The sticks did not fog sensitized photographic emulsion, but a portion of the same purified camphor melted and extruded in contact with air, caused marked fogging in tests with sensitized emulsion. This experiment showed that fogging impurities readily form when purified camphor is heated in contact with air.

*Example IV*

Camphor that caused dense fog in sensitized photographic film was kept in a molten condition at a temperature of 180° C. for 1 hour while protected by an atmosphere of nitrogen. The molten camphor was then flaked as in Example II, the atmosphere of nitrogen being maintained during flaking and cooling of the flaked product to room temperature. The flaked camphor tested free of fogging impurities. This test showed that merely heating impure camphor to its melting point and maintaining it there for an hour or more in an inert atmosphere is sufficient to break down and render harmless the fog-causing impurities.

It is well known that peroxides have a harmful effect on sensitized photographic emulsions, and therefore, efforts are made to exclude peroxides from all materials used in the manufacture of photographic films and from the materials with which the films come in contact up to the time of exposure and development. One of these harmful effects of peroxides in photographic materials is thought to be formation of fog in the sensitized layer.

Tests have shown that any commercial camphor, natural or synthetic, after being heated in contact with air will cause fogging of photographic films, and furthermore it has been found that camphors which do not cause fogging of photographic film do not give a peroxide test. It has been discovered that camphors which cause photographic films to fog lose that property when they are melted and are kept molten in the absence of oxidizing agents for an hour or more and are cooled to room temperature before exposure to any oxidizing influences. Since organic peroxides are broken down by heating in the absence of oxygen, it is assumed that this is what takes place during the heating of fog-causing camphor in the absence of oxygen.

While the foregoing is applicants' theory as to the chemical reactions which take place during their process for the heat-treatment of camphor for photographic purposes, it is to be understood that the process of the invention is wholly independent of such theory.

By the easily operated and economical procedure of this invention one is able to obtain non-fogging synthetic and natural camphors suitable for photographic use.

As many apparently widely different embodiments of this invention may be made without departing from the spirit and scope thereof, it is to be understood that we do not limit ourselves to the specific embodiments thereof except as defined in the appended claims.

We claim:

1. In a process of preparing camphor for use in photographic film, the steps which comprise surrounding camphor with an oxygen-free medium, heating the camphor to at least a molten stage unexposed to oxidizing agents until fog-producing impurities are destroyed, and finally cooling the heat-treated camphor to a temperature at which it is unreactive with oxygen while still maintaining a non-oxidizing surrounding atmosphere.

2. In a process of preparing camphor for use in photographic film, the steps which comprise surrounding camphor with an oxygen-free medium, heating the camphor to a molten condition unexposed to oxidizing agents and so maintaining it until fog-producing impurities are destroyed and finally cooling the heat-treated camphor to a temperature at which it is unreactive with oxygen while still maintaining a non-oxidizing surrounding atmosphere.

3. In a process of preparing camphor for use in photographic film, the steps which comprise surrounding camphor with an atmosphere of nitrogen, heating the camphor to at least a molten stage surounded by nitrogen until fog-producing impurities are destroyed, and finally cooling the heat-treated camphor to a temperature at which it is unreactive with oxygen while still maintaining the surrounding atmosphere of nitrogen.

4. A process as in claim 3 wherein carbon dioxide is substituted for nitrogen to provide a non-reactive atmosphere.

5. In a process of preparing camphor for use in photographic film, the steps which comprise surrounding camphor with an oxygen-free medium, heating the camphor to a molten condition unexposed to oxidizing agents and so maintaining it until fog-producing impurities are destroyed, re-forming the camphor into desired forms unexposed to oxidizing agents, and finally cooling the heat-treated solidified camphor to a temperature at which it is unreactive with oxygen while still maintaining a non-oxidizing surrounding atmosphere.

6. In a process of preparing camphor for use in photographic film by steam distillation, the improvement which comprises cooling and drying the distilled camphor in a current of inert gas.

7. In a process of preparing camphor for use in photographic films the steps which comprise distilling synthetic camphor in an oxygen free medium cooling the distilled camphor into desired forms unexposed to oxidizing agents, and finally cooling the solidified camphor to a temperature at which it is unreactive with oxygen while still maintaining a non-oxidizing surrounding atmosphere.

8. In a process of preparing camphor for use in photographic films the steps which comprise distilling synthetic camphor in an oxygen free medium, condensing the camphor vapor into liquid form in an oxygen free medium, and finally cooling the liquefied camphor to a temperature at which it is unreactive with oxygen while still maintaining a non-oxidizing atmosphere.

LEE CONE HOLT.
GASTAŌ ETZEL.